(12) United States Patent
Sprock et al.

(10) Patent No.: US 6,798,800 B2
(45) Date of Patent: Sep. 28, 2004

(54) METHOD AND APPARATUS TO SENSE TEMPERATURE OF THERMAL TUNING ELEMENTS IN TUNABLE OPTICAL DEVICES

(75) Inventors: Douglas A. Sprock, San Jose, CA (US); Robert A. Carney, Belmont, CA (US); Timothy L. Robertson, Vallejo, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/334,509

(22) Filed: Dec. 30, 2002

(65) Prior Publication Data

US 2004/0125857 A1 Jul. 1, 2004

(51) Int. Cl.$^7$ ................................................. H01S 3/04
(52) U.S. Cl. ............................................................ 372/34
(58) Field of Search .............................. 372/20, 34, 36, 372/21, 29.02, 33

(56) References Cited

U.S. PATENT DOCUMENTS

| | | | |
|---|---|---|---|
| 4,771,393 A | 9/1988 | Ishida et al. ................ 702/133 |
| 5,036,702 A | 8/1991 | Akamatsu et al. ........ 73/204.15 |
| 5,183,039 A | 2/1993 | Sarian et al. ................. 607/96 |
| 5,325,229 A | 6/1994 | Millard ....................... 359/330 |
| 5,360,266 A | 11/1994 | Lenfers et al. ................ 374/36 |
| 5,936,987 A | * 8/1999 | Ohishi et al. .......... 372/29.014 |
| 6,231,153 B1 | 5/2001 | Elgee ........................... 347/17 |
| 6,483,625 B2 | 11/2002 | Shimura et al. .............. 398/95 |

* cited by examiner

Primary Examiner—Quyen Leung
(74) Attorney, Agent, or Firm—Blakely, Sokoloff, Taylor & Zafman LLP

(57) ABSTRACT

A tunable optical unit includes a resistive temperature device (RTD), a thermal tuning device and a measurement circuit. The RTD has a resistance dependent on a temperature of the thermal tuning device. The measurement circuit outputs a signal that is dependent on the resistance of the RTD. The signal is used to control the temperature of the thermal tuning device in tuning the tunable optical unit. A reference resistance can be connected in series with the RTD to make ratio-metric measurements to determine the RTD's resistance (and hence the temperature of the tuning elements) without having to know the value of the current conducted through the RTD and to reduce sensitivity to fluctuations in the excitation signal.

25 Claims, 5 Drawing Sheets

METHOD AND APPARATUS TO SENSE TEMPERATURE OF THERMAL TUNING ELEMENTS IN TUNABLE OPTICAL DEVICES

CROSS REFERENCE TO RELATED APPLICATIONS

The present application is related to co-pending U.S. application Ser. No. 10/334,344 entitled "Remote Reference Resistors" and filed on the same date as the present application.

FIELD OF THE INVENTION

Embodiments of the invention relate generally to tunable optical devices and more specifically but not exclusively to temperature sensing in thermal tuning elements in tunable optical devices.

BACKGROUND INFORMATION

Tunable external cavity lasers ("ECLs") are widely used in lightwave test-and-measurement equipment and are becoming recognized as essential components for the rapidly expending field of wavelength division multiplexed ("WDM") optical communication. The many applications within this field require many different sets of performance specifications. However, the following are some typical requirements: small form factor of the opto-mechanical assembly and control system, control over the output laser wavelength, reliability of the laser assembly, and inexpensive fabrication costs.

A known method to selectively tune the central lasing wavelength of an ECL is to place a wedge shaped optical filter in the path of the laser beam. Tuning is obtained by moving the wedge filter across the optical path. Tuning results from the variation in the thickness of the wedged shape filter that intersects with the laser beam. Alternatively, rotating a flat optical filter in the laser beam path will achieve the desired tuning effect by adjusting the path length that the laser beam must traverse through the optical filter.

These methods of tuning an ECL are undesirable in some applications because they require placement of a mechanical actuator, such as a motor, within the ECL module to effect the desired translation or rotation of the optical filter. Placement of a motor within the ECL module can disrupt other sensitive optic elements that include an ECL and generate disruptive electromagnetic interference. Furthermore, the motor is a severe limitation on the need to miniaturize modern ECL modules. Small motors can be relatively expensive and the use of any mechanical device with moving parts tends to be less reliable than stationary mechanical and electronic substitutes.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following detailed description, numerous specific details are set forth. However, it is understood that embodiments of the invention may be practiced without these specific details. In other instances, well-known circuits, structures, and techniques have not been shown in detail in order to not obscure the understanding of this description. These embodiments are described in sufficient detail to enable those of ordinary skill in the art to practice the invention. The following detailed description is, therefore, not to be taken in a limiting sense, and the scope of the invention is defined only by the appended claims.

Figure 1:
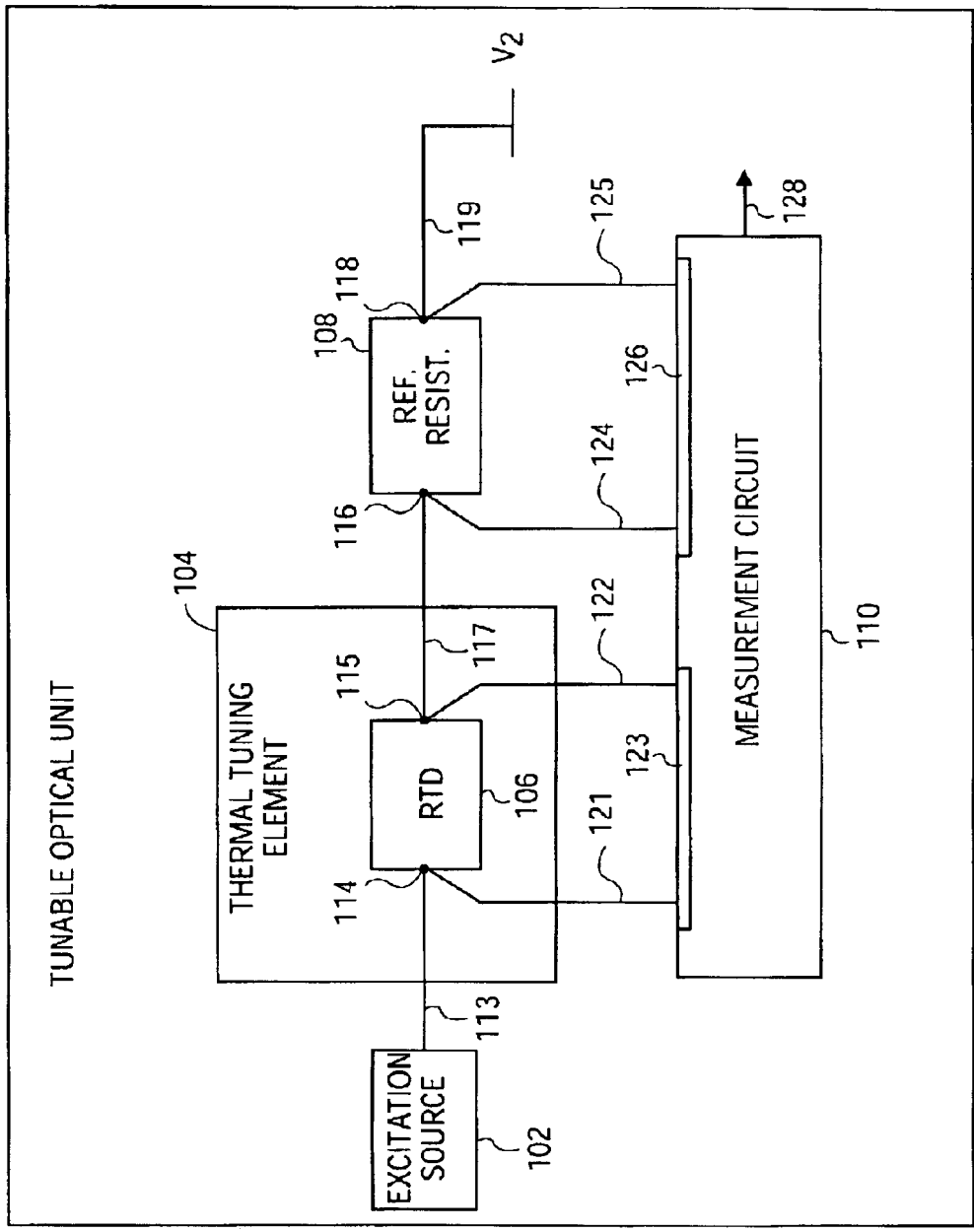
FIG. 1 is a block diagram illustrating a tunable optical unit according to one embodiment of the present invention.

FIG. 1 illustrates a tunable optical unit 100 according to one embodiment of the present invention. Tunable optical unit 100 can be tuned for operation at a selected wavelength (e.g., as an optical filter, an optical transmitter, optical receiver or other optical device). In this embodiment, tunable optical unit 100 includes an excitation source 102, a thermal tuning element 104 having a resistive temperature device (RTD) 106, a reference resistance 108, and a measurement circuit 110. In some embodiments, RTD 106 may be an integral part of thermal tuning element 104 by means of thin film deposition processing. In another embodiment, RTD 106 may be implemented using a thermistor.

In one embodiment, excitation source 102 outputs an electrical signal such as, for example, a selected voltage signal or a selected current signal. RTD 106 is a device that has a resistance that varies with temperature. In one embodiment, RTD 106 is implemented using a structure formed from platinum, which advantageously has a resistance that is linearly related to its temperature over a relatively large temperature range, thereby simplifying the tuning operation. Reference resistance 108 is a resistive device with known resistance. In one embodiment, reference resistance is implemented using a precision low temperature coefficient resistor such as model VSM0805 resistor available from Vishay, Santa Clara, Calif. Measurement circuit 110 is a circuit designed to measure an electrical parameter such as, for example, resistance, voltage, current, etc.

In this embodiment, excitation source 102 has an output lead connected to a node 114 of RTD 106. RTD 106 had another node 115 that is connected to a node 116 of reference resistance 108 via a line 117. As used herein in this context, a line can refer to one or more conductive interconnects or a bus, for example. Reference resistance 108 has another node 118 connected to a supply line $V_2$ (e.g., GROUND) via a line 119. Lines 121 and 122 respectively connect nodes 114 and 115 of RTD 106 to input port 123 of measurement circuit 110. Similarly, lines 124 and 125 respectively connect nodes 116 and 118 of reference resistance to an input port 126 of measurement circuit 110. Measurement circuit 110 provides an output signal at a line 128.

In one embodiment, line 128 is connected to a control circuit (not shown). Tunable optical unit 110 operates as described below in conjunction with FIGS. 1 and 2 in adjusting its operation for a selected wavelength.

Figure 2:
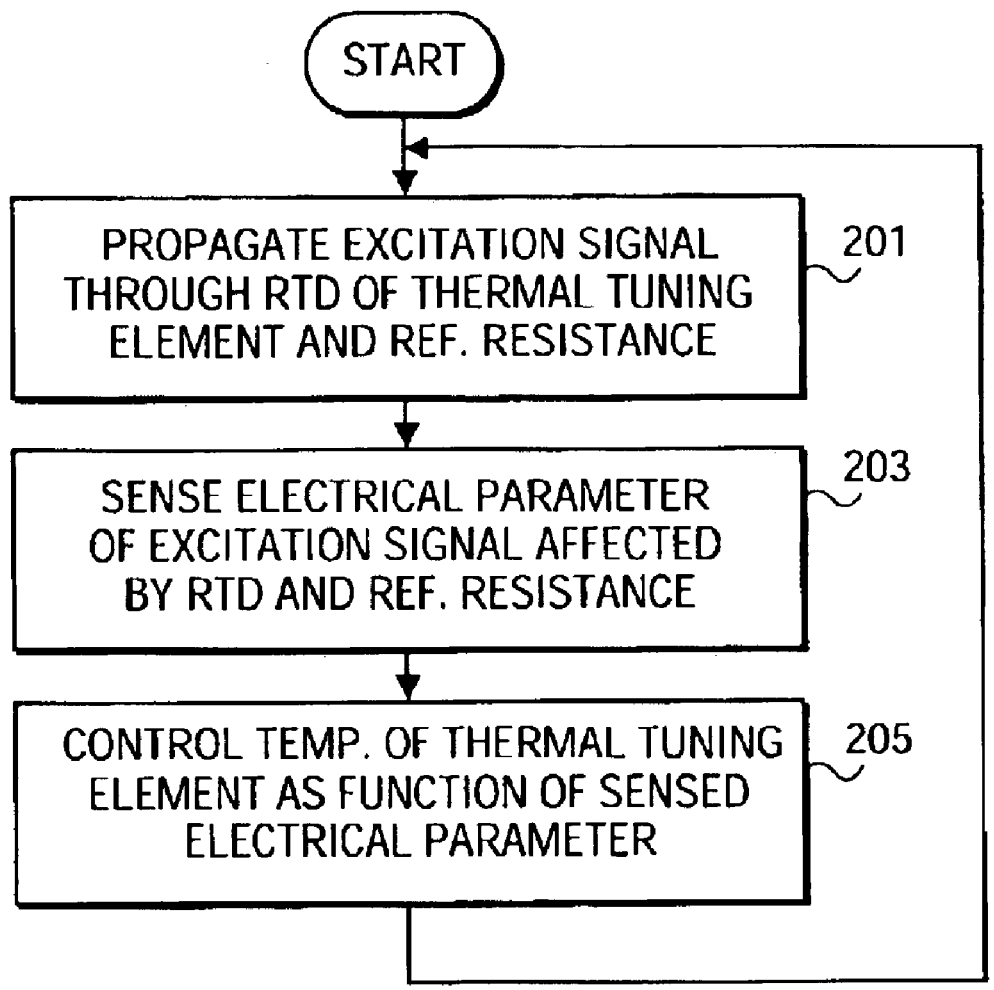
FIG. 2 is a flow diagram illustrating an operational flow of the tunable optical unit of FIG. 1, according to one embodiment of the present invention.

FIG. 2 illustrates an operational flow of tunable optical unit 100 (FIG. 1), according to one embodiment of the present invention. Referring to FIGS. 1 and 2, tunable optical unit 100 operates as follows.

In a tuning operation, an excitation signal is propagated through RTD 106 of thermal tuning element 104. In one embodiment, excitation source 102 outputs the excitation signal, which propagates to node 114 of RTD 106 via line 113. For example, in some embodiments excitation source may be a constant voltage source or a constant current source, providing an electrical signal to RTD 106. RTD 106 then propagates the excitation signal to line 117 via node 115. In some embodiments, the excitation signal then propagates to node 116 of reference resistance 108 via line 117, through the reference resistance to node 118 and to supply line $V_2$ via line 119. The operational flow is represented by a block 201 in FIG. 2.

An electrical parameter of the excitation signal that is affected by RTD 106 is then sensed. In this embodiment, measurement circuit 110 senses the selected electrical parameter. For example, in one embodiment, measurement circuit 110 measures the voltage drop across RTD 106 via lines 121 and 122. Measurement circuit 110, in one embodiment, can sample the voltage, generate a digital value corresponding to the voltage drop, and buffer the digital value to be outputted when needed via line 128. In some embodiments, an electrical parameter of the excitation signal that is affected by reference resistance 108 is also sensed. For example, measurement circuit 110 can also measure the voltage drop across reference resistance 108 via lines 124 and 125 in a manner that is similar to that described above for measuring the voltage drop across RTD 106. This operational flow is represented by a block 203 in FIG. 2.

The temperature of thermal tuning element 104 is then controlled as a function of the sensed electrical parameter(s). In this embodiment, measurement circuit 110 outputs a signal that depends on the sensed electrical parameter via line 128, which is then used by another circuit (not shown) to adjust the temperature of thermal tuning element 104 to a desired level. For example, tunable optical unit 100 may be an optical transmitter to transmit an optical signal of a selected wavelength. The temperature of thermal tuning element 104 may be controlled via a feedback loop to maintain the output optical signal's wavelength at the desired wavelength.

In some embodiments in which measurement circuit 110 measures the voltage drops across RTD 106 and reference resistance 108, the resistance of RTD 106 can be determined ratio-metrically by dividing the voltage drop across RTD 106 by the voltage drop across reference resistance 108 using a constant current excitation signal. In other embodiments, the excitation signal can be a constant voltage. Because the resistance value of reference resistance 108 is relatively precisely known and the current is shared, the value of the current is cancelled from the ratio. Thus, advantageously, the value of the current need not be known to determine the resistance of RTD 106. Furthermore, the ratio-metric measurement is relatively insensitive to fluctuations and noise in the excitation signal.

In addition, because the voltage measurements are differential measurements via lines 121 and 122, measurement circuit 110 is relatively insensitive to common mode noise on lines 121 and 122.

Because the resistance of RTD 106 corresponds to a temperature, the temperature of thermal tuning element 104 can be determined. Accordingly, using known control system techniques, thermal tuning element 104 can be adjusted using the voltage measurements. This operational flow is represented by a block 205 in FIG. 2.

Figure 3:
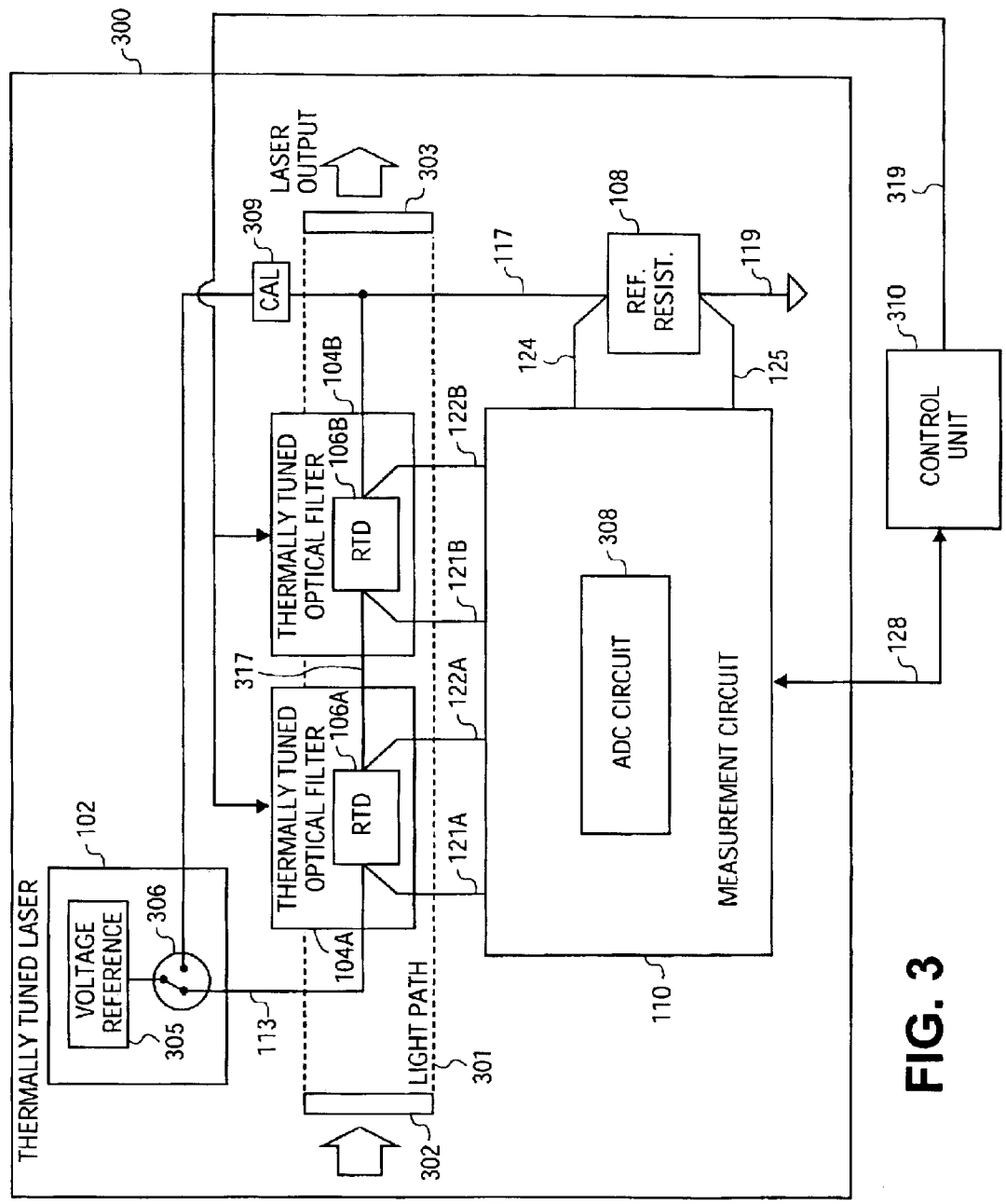
FIG. 3 is a block diagram illustrating a thermally tuned laser implementation of the tunable optical unit of FIG. 1, according to one embodiment of the present invention.

FIG. 3 illustrates a thermally tuned laser 300 that is, in effect, an implementation of tunable optical unit 100 (FIG. 1), according to one embodiment of the present invention. In this embodiment, thermally tuned laser 300 includes excitation source 102, reference resistance 108 and measurement circuit 110 as in tunable optical unit 100 (FIG. 1). In addition, thermally tuned laser 300 includes a laser light path 301 defined by reflectors 302 and 303, thermal tuning elements 104A and 104B (each substantially similar to thermal tuning element 104 described above in conjunction with FIG. 1), a voltage reference 305, a switch 306, and an analog-to-digital (ADC) circuit 308. In this embodiment, a calibration resistance 309 is included, which can be omitted in other embodiments. In this embodiment, thermal tuning elements 104A and 104B (which respectively include RTDs 106A and 106B) are thermally tuned optical filters. Switch 306 has a common terminal, a first output terminal and a second output terminal.

In this embodiment, voltage reference 305 and switch 306 are part of excitation source 102, with voltage reference 305 having its output terminal connected to the common terminal of switch 306. The first output terminal of switch 306 is connected to line 113 so that excitation source can selectively maintain line 113 at a substantially constant voltage. The second output terminal of switch 306 is connected to line 117 in this embodiment.

RTDs 106A and 106B are disposed in laser light path 301 and connected in series via a line 317. In particular, RTD 106A has a node connected to line 113 and another node connected to line 317. RTD 106B has a node connected to line 317 and another node connected to line 117. Reference resistance 108 is connected to line 117 and, in this embodiment, to GROUND via line 119.

In this embodiment, ADC circuit 308 is part of measurement circuit 110, which is connected to RTD 106A via lines 121A and 122A, and connected to RTD 106B via lines 121B and 122B. In addition, measurement circuit 110 is connected to a control unit 310 (external to thermally tuned laser 300 in this embodiment) via line 128. Control unit 310 is connected to thermally tuned optical filters 104A and 104B via a line 319. In some embodiments, control unit 310 is a processor-based unit that includes firmware or software to perform desired control functions (including those described below).

In a tuning operation, thermally tuned laser 300 operates in a substantially similar manner as described above for tunable optical unit 100 (FIG. 1). In some embodiments, control unit 310 can sense and control the temperatures of thermally tuned optical filters 104A and 104B to have different temperatures. In this way, the wavelength(s) of the laser output can be controlled.

More particularly, in this embodiment, control unit 310 causes switch 306 to couple the output terminal of voltage reference 305 to line 113, while leaving calibration resistance open-circuited. Thus, reference resistance 108 and RTDs 106A and 106B are connected in series and conduct substantially the same current. Any differences in current conducted by these elements can be accounted for in a calibration operation (one embodiment of which is described below). ADC circuit 308 measures the voltage drops across each of reference resistance 108, RTD 106A and RTD 106B. In some embodiments, ADC circuit 308 includes a multi-port ADC, while in other embodiments, ADC circuit 308 includes a single ADC with a three-port multiplexer to selectively measure the voltage drop across these three elements. As described above for tunable optical unit 100 (FIG. 1), the voltage drop (and thus the resistance) of RTDs 106A and 106B can be accurately measured using the aforementioned ratio-metric techniques, which in turn can be used to control the temperature of thermally tuned optical filters so that the laser output will have the desired wavelength(s). Further, in some embodiments, the voltage drops are measured substantially simultaneously so that fluctuations and/or noise in the excitation signal will be common in both measurements, allowing for cancellation via the ratio-metric measurement techniques.

In this embodiment, thermally tuned laser 300 can perform a calibration operation. In a calibration operation, control unit 310 causes switch 306 to connect the output terminal of voltage reference 305 to line 117, thereby bypassing RTDs 106A and 106B and replacing them with calibration resistance 309 that has a known resistance. Calibration resistance 309 is provided so that excitation source 102 and reference resistance 108 experience substantially similar conditions in the calibration mode as in non-calibration mode. Measurement circuit 110 then measures the voltages across RTDs 106A and 106B. The measured voltages are likely due to leakage in ADC circuit 308 and interconnect resistances. Control unit 310 can use these measurements during non-calibration operation for improved accuracy. In other embodiments, other calibration approaches may be used.

Figure 4:
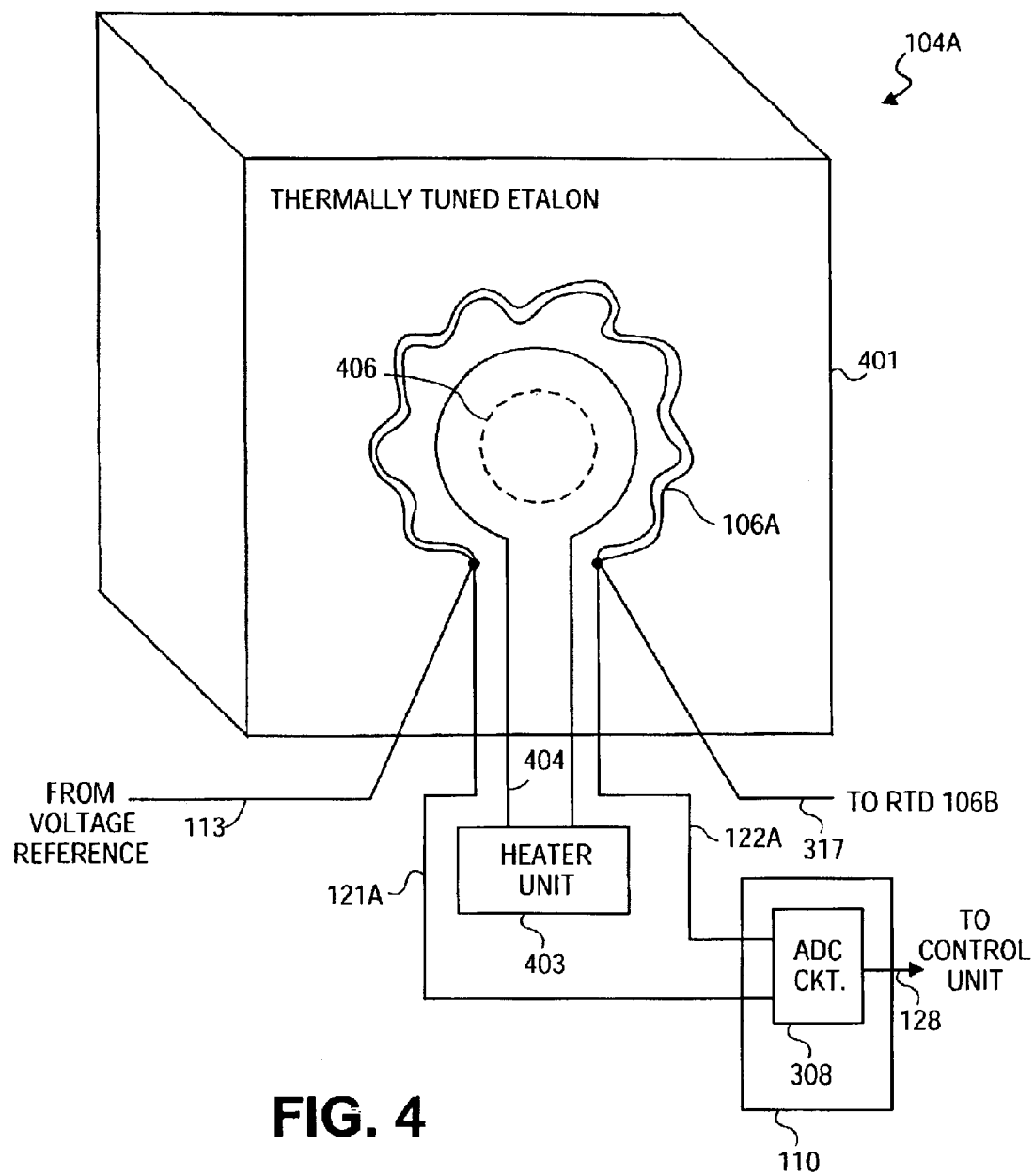
FIG. 4 is a block diagram illustrating a thermally tuned etalon implementing a thermally tuned optical filter of FIG. 3, according to one embodiment of the present invention.

FIG. 4 illustrates a thermally tuned optical filter 104A (FIG. 3), according to one embodiment of the present invention. In this embodiment, thermally tuned optical filter 104A includes a thermally tuned etalon 401, a heater unit 403, and a heater element 404 that is arranged on a surface of etalon 401 so as to surround an optical signal propagation region 406 (indicated by dashed lines). In this embodiment, RTD 106A is arranged on the same surface of etalon 401, substantially surrounding heater element 404. In one embodiment, RTD 106A is made of platinum formed on the surface of etalon 401 using conventional deposition and photolithographic techniques.

Figure 5:
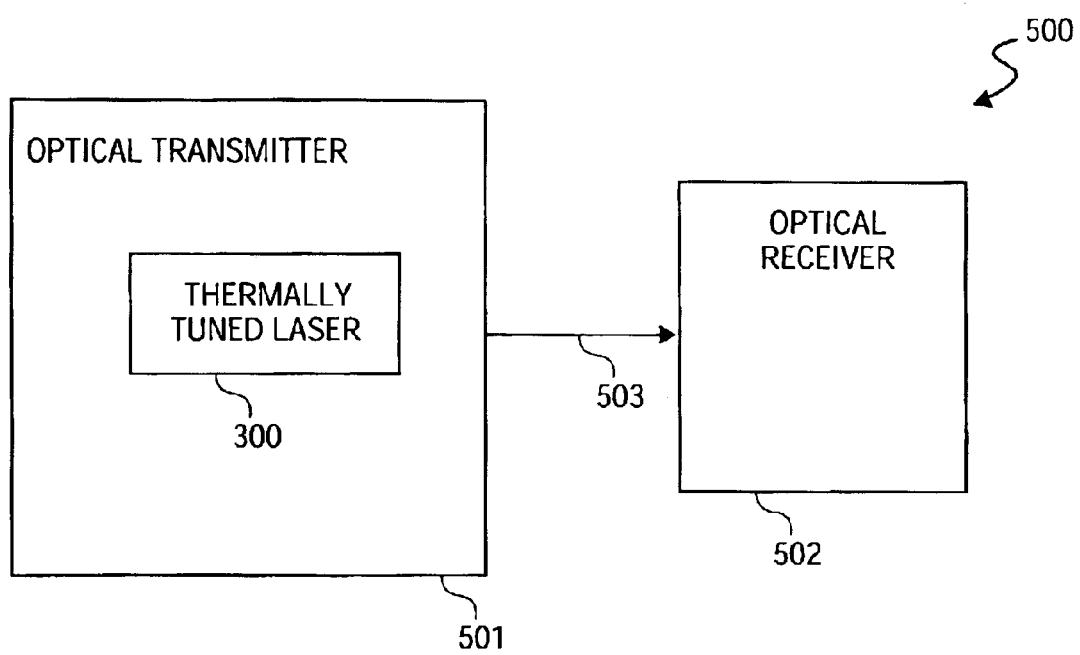
FIG. 5 is a block diagram illustrating an optical communication system using the thermally tuned laser of FIG. 3, according to one embodiment of the present invention.

FIG. 5 is a block diagram illustrating an optical communication system using the thermally tuned laser of FIG. 3, according to one embodiment of the present invention.

Embodiments of method and apparatus for temperature sensing of thermal tuning elements of tunable optical devices are described herein. In the above description, numerous specific details are set forth (such as the materials used to implement RTDs, techniques to accurately measure temperature, etc.) to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring the description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. A method comprising:
   propagating an excitation signal through a resistive temperature device (RTD) having a resistance that depends on a temperature of a thermal tuning element of a tunable optical device;
   propagating the excitation signal through a reference resistance; and
   selectively adjusting the temperature of the thermal tuning element responsive at least in part to a sensed electrical parameter affected by the RTD and at least in part to a sensed electrical parameter affected by the reference resistance.

2. The method of claim 1, wherein the excitation signal causes the RTD and the reference resistance to conduct substantially equal currents.

3. The method of claim 2, wherein selectively adjusting the temperature further comprises:
   measuring a first voltage across the reference resistance;
   measuring a second voltage across the RTD; and
   determining a value for the resistance of the RTD as a function of a ratio of the first and second voltages.

4. The method of claim 3, wherein the first and second voltages are measured substantially concurrently.

5. The method of claim 3, further comprising coupling a calibration resistance to bypass the RTD during a calibration operation.

6. The method of claim 3, wherein measuring the second voltage across the RTD comprises:

conducting a current through the RTD; and measuring the second voltage across the RTD using a voltage measuring device so that substantially no portion of the current flows through the voltage measuring device.

7. The method of claim 6 wherein the voltage measuring device comprises an analog-to-digital converter.

8. The method of claim 1 wherein the temperature of the thermal tuning element is adjusted in tuning a tunable laser.

9. The method of claim 8 wherein the thermal tuning element comprises an optical filter.

10. The method of claim 9 wherein the optical filter comprises an etalon.

11. An apparatus comprising:

a resistive temperature device (RTD) to have a resistance dependent on a temperature of a thermal tuning element of a tunable optical device;

a measurement circuit to measure the RTD's resistance;

a reference resistance coupled to the RTD and the measurement circuit; and a control unit to selectively adjust the temperature of the thermal tuning element in response to the measured resistance of the RTD.

12. The apparatus of claim 11, wherein the measurement circuit measures the RTD's resistance using an excitation signal that is propagated by the RTD and the reference resistance.

13. The apparatus of claim 12 wherein the measurement circuit is arranged to measure a voltage across the RTD and a voltage across the reference resistance.

14. The apparatus of claim 13 wherein the measurement circuit is arranged to measure the voltages across the RTD and the reference resistance substantially simultaneously.

15. The apparatus of claim 13 wherein the measurement circuit comprises an analog-to-digital converter.

16. The apparatus of claim 15 wherein the analog-to-digital converter is a multi-port analog-to-digital converter.

17. A system comprising:

an optical receiver; and an optical transmitter to transmit an optical signal to the optical receiver, the optical transmitter including:

a resistive temperature device (RTD) to have a resistance dependent on a temperature of a thermal tuning element of a tunable optical device;

a measurement circuit to measure the RTD's resistance;

a reference resistance coupled to the RTD and the measurement circuit; and a control unit to selectively adjust the temperature of the thermal tuning element in response to the measured resistance of the RTD.

18. The system of claim 17 wherein the measurement circuit measures the RTD's resistance using an excitation signal that is propagated by the RTD and the reference resistance.

19. The system of claim 18 wherein the measurement circuit is arranged to measure a voltage across the RTD and a voltage across the reference resistance.

20. The system of claim 18 wherein the measurement circuit comprises an analog-to-digital converter.

21. The system of claim 20 wherein the analog-to-digital converter is a multi-port analog-to-digital converter.

22. An apparatus comprising:

a resistive temperature device (RTD) having a resistance that depends on a temperature of a thermal tuning element of a tunable optical device;

a reference resistance connected in series with the RTD; and means for selectively adjusting the temperature of the thermal tuning element responsive at least in part to a sensed electrical parameter affected by the RTD and at least in cart to a sensed electrical nanometer affected by the reference resistance.

23. The apparatus of claim 22, further comprising means for generating an excitation signal, the excitation signal causing the RTD and the reference resistance to conduct substantially equal currents.

24. The apparatus of claim 23, wherein the means for selectively adjusting includes:

means for measuring a first voltage across the reference resistance and for measuring a second voltage across the RTD; and means for determining a value for the resistance of the RTD as a function of a ratio of the first and second voltages.

25. The apparatus of claim 24, wherein the means for measuring measures the first and second voltages substantially simultaneously.

* * * * *

UNITED STATES PATENT AND TRADEMARK OFFICE
CERTIFICATE OF CORRECTION

PATENT NO. : 6,798,800 B2
DATED : September 28, 2004
INVENTOR(S) : Sprock et al.

It is certified that error appears in the above-identified patent and that said Letters Patent is hereby corrected as shown below:

Column 8,
Line 28, delete "cart" and insert -- part --.
Line 28, delete "nanometer" and insert -- parameter --.

Signed and Sealed this

Twenty-fourth Day of May, 2005

JON W. DUDAS
*Director of the United States Patent and Trademark Office*